US007536513B2

(12) United States Patent
Guthrie et al.

(10) Patent No.: US 7,536,513 B2
(45) Date of Patent: May 19, 2009

(54) DATA PROCESSING SYSTEM, CACHE SYSTEM AND METHOD FOR ISSUING A REQUEST ON AN INTERCONNECT FABRIC WITHOUT REFERENCE TO A LOWER LEVEL CACHE BASED UPON A TAGGED CACHE STATE

(75) Inventors: Guy L. Guthrie, Austin, TX (US); Aaron C. Sawdey, Cannon Falls, MN (US); William J. Starke, Round Rock, TX (US); Jeffrey A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 11/095,734

(22) Filed: Mar. 31, 2005

(65) Prior Publication Data

US 2006/0224833 A1 Oct. 5, 2006

(51) Int. Cl.
G06F 13/00 (2006.01)
G06F 13/28 (2006.01)
G06F 12/00 (2006.01)
(52) U.S. Cl. ...................................... 711/141
(58) Field of Classification Search .................. 711/141
See application file for complete search history.

(56) References Cited

U.S. PATENT DOCUMENTS

| 5,826,052 | A | * | 10/1998 | Stiles et al. ................. 712/205 |
| 5,852,716 | A | | 12/1998 | Hagersten |
| 6,347,361 | B1 | * | 2/2002 | Arimilli et al. .............. 711/141 |
| 6,397,303 | B1 | * | 5/2002 | Arimilli et al. .............. 711/141 |
| 6,490,660 | B1 | * | 12/2002 | Gilda et al. .................. 711/141 |
| 6,606,676 | B1 | | 8/2003 | Deshpande et al. |
| 6,629,210 | B1 | * | 9/2003 | Arimilli et al. .............. 711/141 |
| 6,636,949 | B2 | * | 10/2003 | Barroso et al. .............. 711/141 |
| 6,658,539 | B2 | * | 12/2003 | Arimilli et al. .............. 711/141 |
| 6,701,416 | B1 | * | 3/2004 | Arimilli et al. .............. 711/141 |

(Continued)

OTHER PUBLICATIONS

Jim Handy; "the Cache Memory book: The authoritative reference on cache design, second edition"; Academic Press; 1998; pp. 12 and 204.*

(Continued)

*Primary Examiner*—Matt Kim
*Assistant Examiner*—Christopher D Birkhimer
(74) *Attorney, Agent, or Firm*—Dillon & Yudell LLP

(57) ABSTRACT

In response to a master receiving a memory access request indicating a target address, the master accesses a first cache directory of an upper level cache of a cache hierarchy. In response to the target address being associated in the first cache directory with an entry having a valid address tag and a first invalid coherency state, the master issues a request specifying the target address on an interconnect fabric without regard to a coherency state associated with the target address in a second cache directory of a lower level cache of the cache hierarchy. In response to the target address having a second invalid coherency state with respect to the first cache directory, the master issues a request specifying the target address on an interconnect fabric after determining a coherency state associated with the target address in the second cache directory of the lower level cache of the cache hierarchy.

18 Claims, 7 Drawing Sheets

U.S. PATENT DOCUMENTS

| | | |
|---|---|---|
| 7,096,323 B1 | 8/2006 | Conway et al. |
| 7,162,590 B2 | 1/2007 | Pruvost et al. |
| 2003/0009637 A1 | 1/2003 | Arimilli et al. |
| 2003/0097529 A1 | 5/2003 | Arimilli et al. |
| 2003/0097531 A1* | 5/2003 | Arimilli et al. ............... 711/146 |
| 2003/0154350 A1 | 8/2003 | Edirisooriya et al. |
| 2004/0024958 A1* | 2/2004 | Bains et al. .................. 711/105 |
| 2005/0060499 A1* | 3/2005 | Gilbert et al. ............... 711/144 |
| 2006/0224833 A1 | 10/2006 | Guthrie et al. |

OTHER PUBLICATIONS

David A. Patterson and John L. Hennessy, "COmputer Organization And Design"The Hardware/Software Interface, Third Edition, 2005, pp. 475-476.*

Jim Handy, "The Cache Memory Cook: The Authoritative Reference On Cache Design", Second Edition, 1998, pp. 156-157.*

Patterson and Hennessy; Computer Architecture- A Quantative Approach; 1996; Morgan Kaufmann Publishers; $2^{nd}$ edition; p. 75.

* cited by examiner

DATA PROCESSING SYSTEM, CACHE SYSTEM AND METHOD FOR ISSUING A REQUEST ON AN INTERCONNECT FABRIC WITHOUT REFERENCE TO A LOWER LEVEL CACHE BASED UPON A TAGGED CACHE STATE

CROSS-REFERENCE TO RELATED APPLICATION(S)

The present application is related to U.S. patent application Ser. No. 11/055,305, which is assigned to the assignee of the present invention and incorporated herein by reference in its entirety.

BACKGROUND OF THE INVENTION

1. Technical Field

The present invention relates in general to data processing and, in particular, to data processing in a cache coherent data processing system.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of coherency states stored in association with the cache lines of each cache hierarchy, as well as a set of coherency messages utilized to communicate the cache state information between cache hierarchies. In a typical implementation, the coherency state information takes the form of the well-known MESI (Modified, Exclusive, Shared, Invalid) protocol or a variant thereof, and the coherency messages indicate a protocol-defined coherency state transition in the cache hierarchy of the requester and/or the recipients of a memory access request.

In conventional multi-processor data processing systems, all levels of cache memory within a cache memory hierarchy are examined to determine their coherency state in response to a memory access request before an operation requesting a memory block is broadcast to other cache hierarchies in the data processing system. The present invention recognizes that this practice increases the access latency for the subset of memory access requests that miss in all levels of the cache hierarchy.

SUMMARY OF THE INVENTION

In view of the foregoing and other shortcomings in the art, the present invention provides an improved cache coherent data processing system, cache system and method of data processing in a cache coherent data processing system.

In one embodiment, in response to a master receiving a memory access request indicating a target address, the master accesses a first cache directory of an upper level cache of a cache hierarchy. In response to the target address being associated in the first cache directory with an entry having a valid address tag and a first invalid coherency state, the master issues a request specifying the target address on an interconnect fabric without regard to a coherency state associated with the target address in a second cache directory of a lower level cache of the cache hierarchy. In response to the target address having a second invalid coherency state with respect to the first cache directory, the master issues a request specifying the target address on an interconnect fabric after determining a coherency state associated with the target address in the second cache directory of the lower level cache of the cache hierarchy.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

DETAILED DESCRIPTION OF ILLUSTRATIVE EMBODIMENT

I. Exemplary Data Processing System

Figure 1:
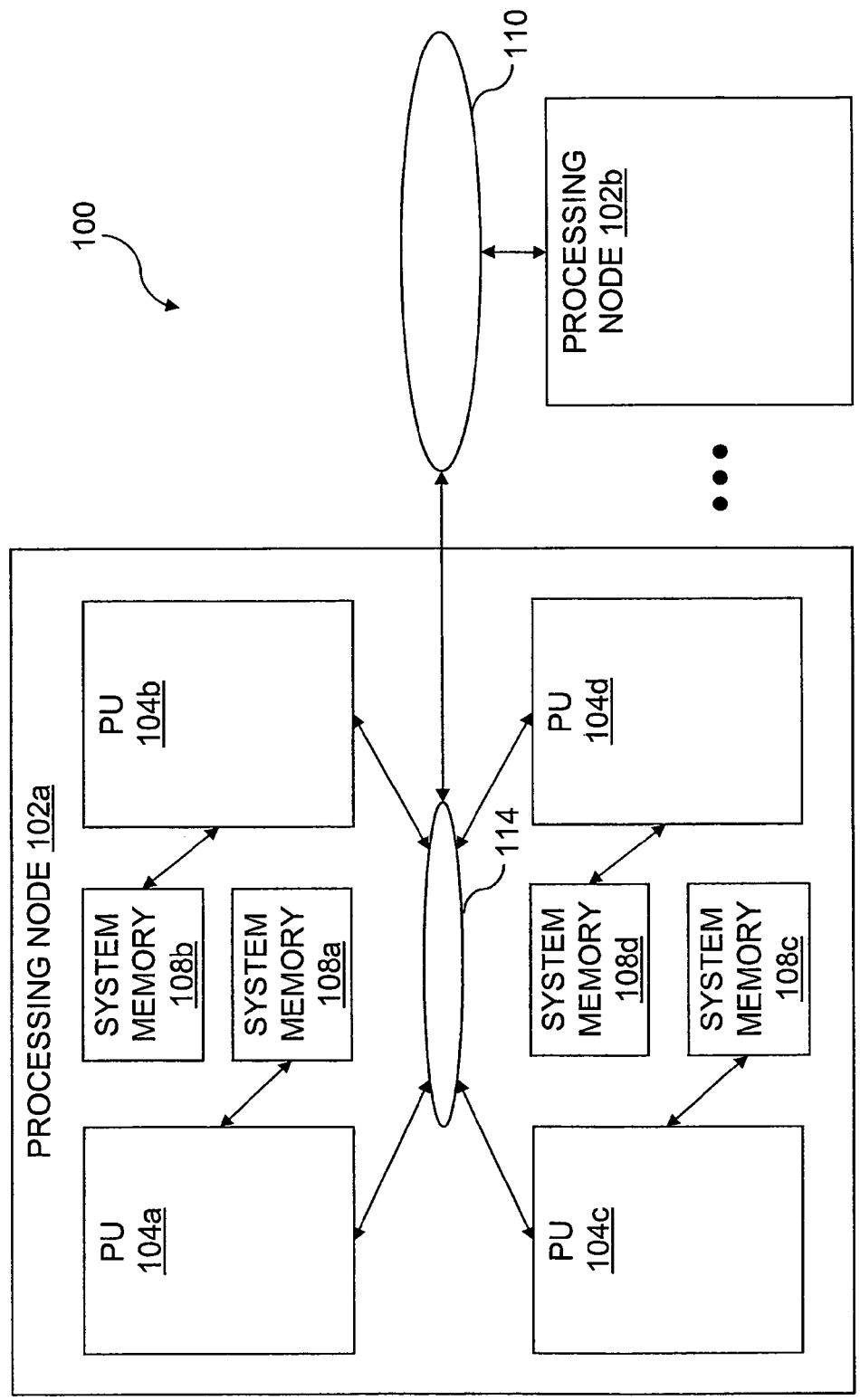
FIG. 1 is a high level block diagram of an exemplary data processing system in accordance with the present invention.

With reference now to the figures and, in particular, with reference to FIG. 1, there is illustrated a high level block diagram of an exemplary embodiment of a cache coherent symmetric multiprocessor (SMP) data processing system in accordance with the present invention. As shown, data processing system 100 includes multiple processing nodes 102a, 102b for processing data and instructions. Processing nodes 102a, 102b are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104a-104d within each processing node 102 are coupled for communication by a local interconnect 114, which, like system interconnect 110, may be implemented with one or more buses and/or switches.

The devices coupled to each local interconnect 114 include not only processing units 104, but also one or more system memories 108a-108d. Data and instructions residing in system memories 108 can generally be accessed and modified by a processor core in any processing unit 104 in any processing node 102 of data processing system 100. In alternative embodiments of the invention, one or more system memories 108 can be coupled to system interconnect 110 rather than a local interconnect 114.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Figure 2:
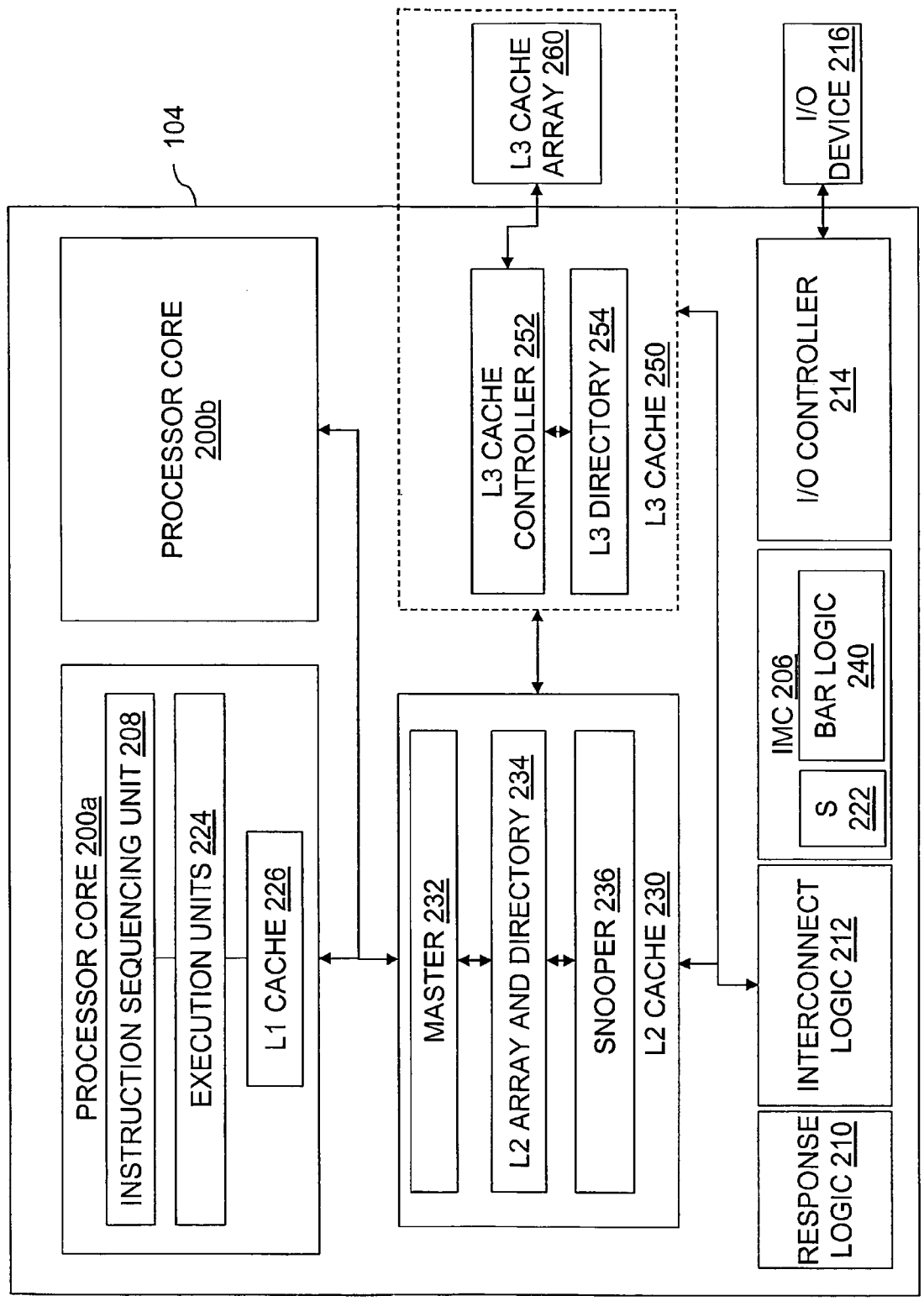
FIG. 2 is a more detailed block diagram of a processing unit in accordance with the invention.

Referring now to FIG. 2, there is depicted a more detailed block diagram of an exemplary processing unit 104 in accordance with the present invention. In the depicted embodiment, each processing unit 104 includes two processor cores 200a, 200b for independently processing instructions and data. Each processor core 200 includes at least an instruction sequencing unit (ISU) 208 for fetching and ordering instructions for execution and one or more execution units 224 for executing instructions. The instructions executed by execution units 224 include load and store instructions that request access to a memory block or cause the generation of a request for access to a memory block.

The operation of each processor core 200 is supported by a multi-level volatile memory hierarchy having at its lowest level shared system memories 108a-108d, and at its upper levels one or more levels of cache memory. In the depicted embodiment, each processing unit 104 includes an integrated memory controller (IMC) 206 that controls read and write access to a respective one of the system memories 108a-108d within its processing node 102 in response to requests received from processor cores 200a-200b and operations snooped by a snooper (S) 222 on the local interconnect 114. IMC 206 determines the addresses for which it is responsible by reference to base address register (BAR) logic 240.

In the illustrative embodiment, the cache memory hierarchy of processing unit 104 includes a store-through level one (L1) cache 226 within each processor core 200 and a level two (L2) cache 230 and a level three (L3) cache 250 shared by all processor cores 200a, 200b of the processing unit 104. L2 cache 230 includes an L2 array and directory 234 and a cache controller comprising a master 232 and a snooper 236. Master 232 initiates transactions on local interconnect 114 and system interconnect 110 and accesses L2 array and directory 234 in response to memory access (and other) requests received from the associated processor cores 200a-200b. Snooper 236 snoops operations on local interconnect 114, provides appropriate responses, and performs any accesses to L2 array and directory 234 required by the operations.

As shown, L3 cache 250 is similarly constructed and includes a cache controller 252, an L3 cache array 260, and an L3 directory 254 of the contents of L3 cache array 260. Although in some embodiments L3 cache array 260 may be implemented on-chip, in the illustrated embodiment L3 cache array 260 is implemented in memory DIMMs external to processing unit 104 in order to permit L3 cache array 260 to have a greater capacity. In various embodiments, L3 cache 250 may be implemented as inclusive, partially inclusive or non-inclusive of the contents of L2 cache 230. Moreover, L3 cache 250 may be implemented as an in-line or lookaside cache. In the illustrated embodiment, L3 cache 250 is implemented as a "victim" cache that is populated by memory blocks castout or victimized by L2 cache 230.

Although the illustrated cache hierarchy includes only three levels of cache, those skilled in the art will appreciate that alternative embodiments may include additional levels (L4, L5 etc.) of on-chip or off-chip in-line or lookaside cache, which may be fully inclusive, partially inclusive, or non-inclusive of the contents the upper levels of cache.

Each processing unit 104 further includes an instance of response logic 210, which implements a portion of the distributed coherency signaling mechanism that maintains cache coherency within data processing system 100. In addition, each processing unit 104 includes an instance of interconnect logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to requests by I/O device 216.

Figure 3:
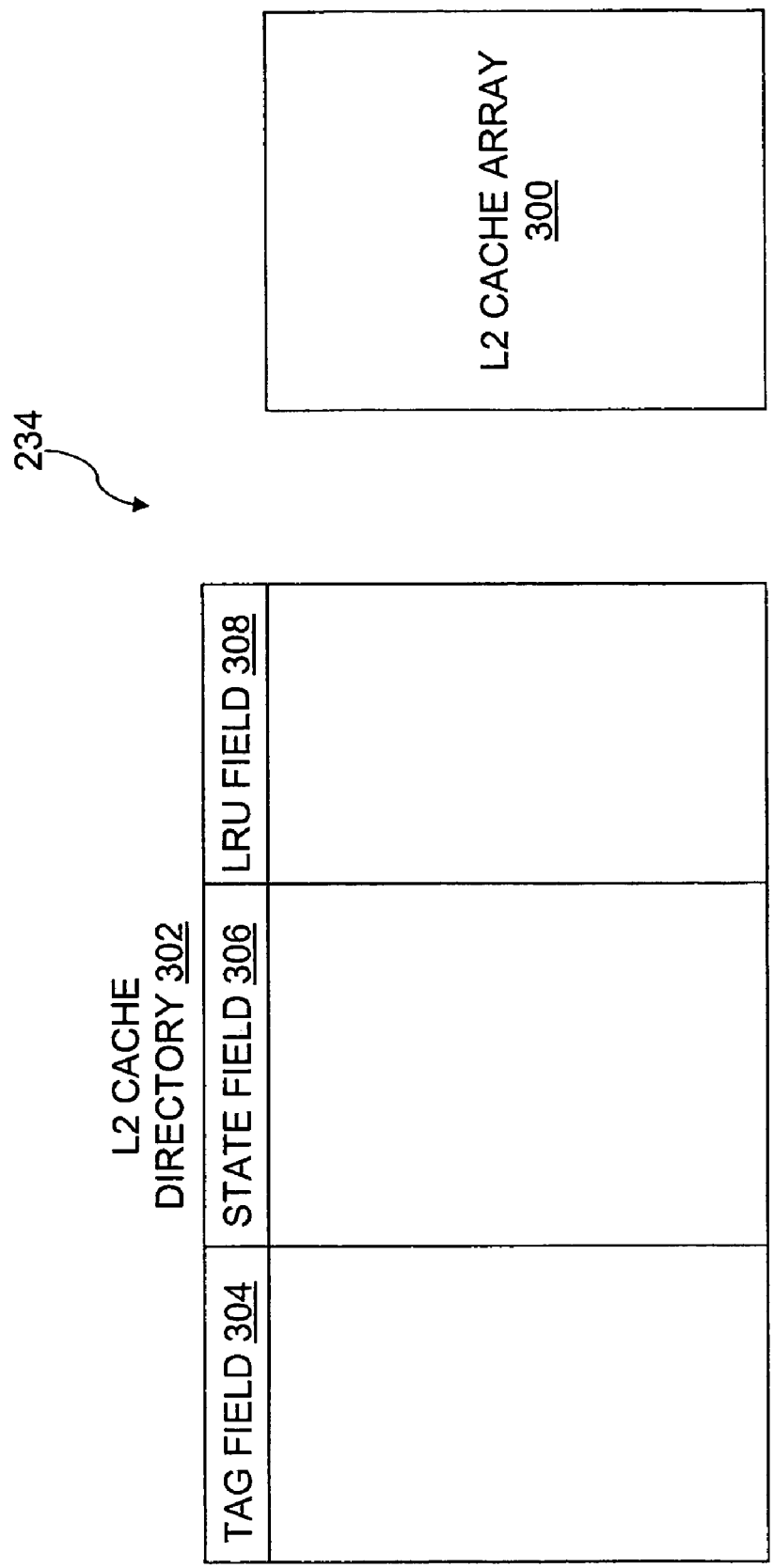
FIG. 3 is a more detailed block diagram of the L2 cache array and directory depicted in FIG. 2.

With reference now to FIG. 3, there is illustrated a more detailed block diagram of an exemplary embodiment of L2 array and directory 234. As illustrated, L2 array and directory 234 includes a set associative L2 cache array 300 and an L2 cache directory 302 of the contents of L2 cache array 300. As in conventional set associative caches, memory locations in system memories 108 are mapped to particular congruence classes within cache arrays 300 utilizing predetermined index bits within the system memory (real) addresses. The particular cache lines stored within cache array 300 are recorded in cache directory 302, which contains one directory entry for each cache line in cache array 300. As understood by those skilled in the art, each directory entry in cache directory 302 comprises at least a tag field 304, which specifies the particular cache line stored in cache array 300 utilizing a tag portion of the corresponding real address, a state field 306, which indicates the coherency state of the cache line, and a LRU (Least Recently Used) field 308 indicating a replacement order for the cache line with respect to other cache lines in the same congruence class. L3 directory 254 may be similarly constructed to L2 directory 302.

II. Exemplary Operation

Figure 4:
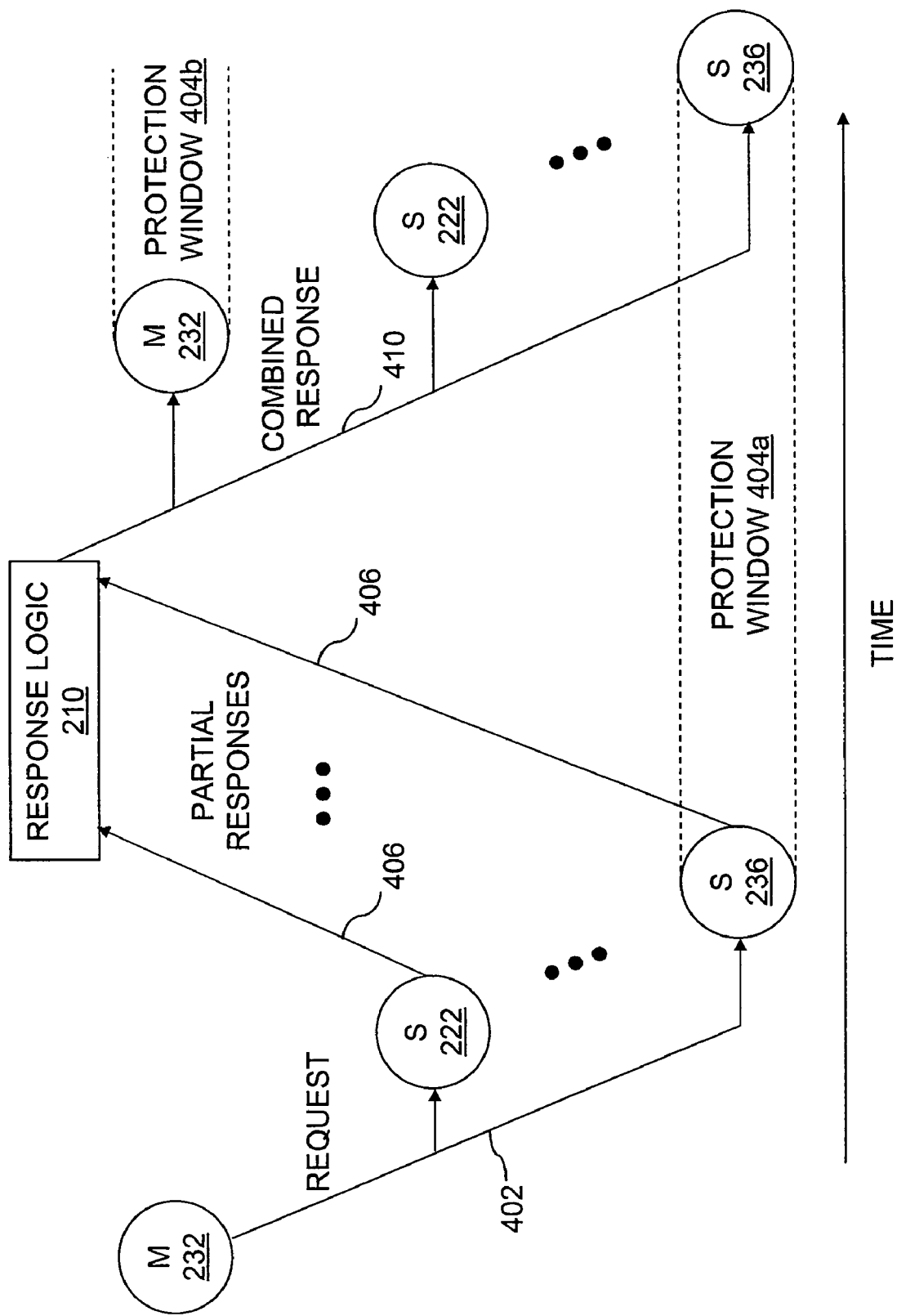
FIG. 4 is a time-space diagram of an exemplary transaction on the system interconnect of the data processing system of FIG. 1.

Referring now to FIG. 4, there is depicted a time-space diagram of an exemplary operation on a local or system interconnect 110, 114 of data processing system 100 of FIG. 1. The operation begins when a master 232 of an L2 cache 230 (or another master, such as an I/O controller 214) issues a request 402 on a local interconnect 114 and/or system interconnect 110. Request 402 preferably includes a transaction type indicating a type of desired access and a resource identifier (e.g., real address) indicating a resource to be accessed by the request. Common types of requests preferably include those set forth below in Table I.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

Request 402 is received by the snooper 236 of L2 caches 230, as well as the snoopers 222 of memory controllers 206 (FIG. 1). In general, with some exceptions, the snooper 236 in the same L2 cache 230 as the master 232 of request 402 does not snoop request 402 (i.e., there is generally no self-snooping) because a request 402 is transmitted on local interconnect 114 and/or system interconnect 110 only if the request 402 cannot be serviced internally by a processing unit 104. Each snooper 222, 236 that receives request 402 provides a respective partial response 406 representing the response of at least that snooper to request 402. A snooper 222 within a memory controller 206 determines the partial response 406 to provide based, for example, whether the snooper 222 is responsible for the request address and whether it has resources available to service the request. A snooper 236 of an L2 cache 230 may determine its partial response 406 based on, for example, the availability of its L2 cache directory 302, the availability of a snoop logic instance within snooper 236 to handle the request, and the coherency state associated with the request address in L2 cache directory 302.

The partial responses of snoopers 222 and 236 are logically combined either in stages or all at once by one or more instances of response logic 210 to determine a system-wide combined response (CR) 410 to request 402. Subject to the scope restrictions discussed below, response logic 210 provides combined response 410 to master 232 and snoopers 222, 236 via its local interconnect 114 and/or system interconnect 110 to indicate the system-wide response (e.g., success, failure, retry, etc.) to request 402. If CR 410 indicates success of request 402, CR 410 may indicate, for example, a data source for a requested memory block, a cache state in which the requested memory block is to be cached by master 232, and whether "cleanup" operations invalidating the requested memory block in one or more L2 caches 230 are required.

In response to receipt of combined response 410, one or more of master 232 and snoopers 222, 236 typically perform one or more operations in order to service request 402. These operations may include supplying data to master 232, invalidating or otherwise updating the coherency state of data cached in one or more L2 caches 230, performing castout operations, writing back data to a system memory 108, etc. As discussed further below, if required by request 402, a requested or target memory block may be transmitted to or from master 232 before or after the generation of combined response 410 by response logic 210.

In the following description, partial response of a snooper 222, 236 to a request and the operations performed the snooper in response to the request and/or its combined response will be described with reference to whether that snooper is a Highest Point of Coherency (HPC), a Lowest Point of Coherency (LPC), or neither with respect to the request address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIGS. 1 and 2, the LPC will be the memory controller 206 for the system memory 108 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIGS. 1 and 2, the HPC, if any, will be an L2 cache 230. Although other indicators may be utilized to designate an HPC for a memory block, a preferred embodiment of the present invention designates the HPC, if any, for a memory block utilizing selected cache coherency state(s) within the L2 cache directory 302 of an L2 cache 230, as described further below with reference to Table II.

Still referring to FIG. 4, the HPC, if any, for a memory block referenced in a request 402, or in the absence of an HPC, the LPC of the memory block, preferably has the responsibility of protecting the transfer of ownership of a memory block in response to a request 402 during a protection window 404a. In the exemplary scenario shown in FIG.

4, the snooper 236 that is the HPC for the memory block specified by the request address of request 402 protects the transfer of ownership of the requested memory block to master 232 during a protection window 404a that extends from the time that snooper 236 determines its partial response 406 until snooper 236 receives combined response 410. During protection window 404a, snooper 236 protects the transfer of ownership by providing partial responses 406 to other requests specifying the same request address that prevent other masters from obtaining ownership until ownership has been successfully transferred to master 232. Master 232 likewise initiates a protection window 404b to protect its ownership of the memory block requested in request 402 following receipt of combined response 410.

Because snoopers 222, 236 all have limited resources for handling the CPU and I/O requests described above, several different levels of partial responses and corresponding CRs are possible. For example, if a snooper 222 within a memory controller 206 that is responsible for a requested memory block has queue available to handle a request, the snooper 222 may respond with a partial response indicating that it is able to serve as the LPC for the request. If, on the other hand, the snooper 222 has no queue available to handle the request, the snooper 222 may respond with a partial response indicating that is the LPC for the memory block, but is unable to currently service the request.

Similarly, a snooper 236 in an L2 cache 230 may require an available instance of snoop logic and access to L2 cache directory 302 in order to handle a request. Absence of access to either (or both) of these resources results in a partial response (and corresponding CR) signaling an inability to service the request due to absence of a required resource.

Hereafter, a snooper 222, 236 providing a partial response indicating that the snooper has available all internal resources required to service a request, if required, is said to "affirm" the request. For snoopers 236, partial responses affirming a snooped operation preferably indicate the cache state of the requested or target memory block at that snooper 236. A snooper 236 providing a partial response indicating that the snooper 236 does not have available all internal resources required to service the request may be said to be "possibly hidden." Such a snooper 236 is "possibly hidden" because the snooper 236, due to lack of an available instance of snoop logic or access to L2 cache directory 302, cannot "affirm" the request in sense defined above and has, from the perspective of other masters 232 and snoopers 222, 236, an unknown coherency state.

III. Data Delivery Domains

Conventional broadcast-based data processing systems handle both cache coherency and data delivery through broadcast communication, which in conventional systems is transmitted on a system interconnect to at least all memory controllers and cache hierarchies in the system. As compared with systems of alternative architectures and like scale, broadcast-based systems tend to offer decreased access latency and better data handling and coherency management of shared memory blocks.

As broadcast-based system scale in size, traffic volume on the system interconnect is multiplied, meaning that system cost rises sharply with system scale as more bandwidth is required for communication over the system interconnect. That is, a system with m processor cores, each having an average traffic volume of n transactions, has a traffic volume of m×n, meaning that traffic volume in broadcast-based systems scales multiplicatively not additively. Beyond the requirement for substantially greater interconnect bandwidth, an increase in system size has the secondary effect of increasing some access latencies. For example, the access latency of read data is limited, in the worst case, by the combined response latency of the furthest away lower level cache holding the requested memory block in a shared coherency state from which the requested data can be sourced.

In order to reduce system interconnect bandwidth requirements and access latencies while still retaining the advantages of a broadcast-based system, the present invention reduces data access latency by decreasing the average distance between a requesting L2 cache 230 and an data source. One technique for do so is to reducing the average distance between a requesting L2 cache 230 and a data source is to permit multiple L2 caches 230 distributed throughout data processing system 100 to hold copies of the same memory block in a "special" shared coherency state that permits these caches to supply the memory block to requesting L2 caches 230 using cache-to-cache intervention.

In order to implement multiple concurrent and distributed sources for shared memory blocks in an SMP data processing system, such as data processing system 100, two issues must be addressed. First, some rule governing the creation of copies of memory blocks in the "special" shared coherency state alluded to above must be implemented. Second, there must be a rule governing which snooping L2 cache 230, if any, provides a shared memory block to a requesting L2 cache 230, for example, in response to a bus read operation or bus RWITM operation.

According to the present invention, both of these issues are addressed through the implementation of data sourcing domains. In particular, each domain within a SMP data processing system, where a domain is defined to include one or more lower level (e.g., L2) caches that participate in responding to data requests, is permitted to include only one cache hierarchy that holds a particular memory block in the "special" shared coherency state at a time. That cache hierarchy, if present when a bus read-type (e.g., read or RWITM) operation is initiated by a requesting lower level cache in the same domain, is responsible for sourcing the requested memory block to the requesting lower level cache. Although many different domain sizes may be defined, in data processing system 100 of FIG. 1, it is convenient if each processing node 102 (i.e., MCM) is considered a data sourcing domain. One example of such a "special" shared state (i.e., Sr) is described below with reference to Table II.

IV. Coherency Domains

While the implementation of data delivery domains as described above improves data access latency, this enhancement does not address the m×n multiplication of traffic volume as system scale increases. In order to reduce traffic volume while still maintaining a broadcast-based coherency mechanism, preferred embodiments of the present invention additionally implement coherency domains, which like the data delivery domains hereinbefore described, can conveniently (but are not required to be) implemented with each processing node 102 forming a separate coherency domain. Data delivery domains and coherency domains can be, but are not required to be coextensive, and for the purposes of explaining exemplary operation of data processing system 100 will hereafter be assumed to have boundaries defined by processing nodes 102.

The implementation of coherency domains reduces system traffic by limiting inter-domain broadcast communication over system interconnect 110 in cases in which requests can be serviced with participation by fewer than all coherency domains. For example, if processing unit 104a of processing node 102a has a bus read operation to issue, then processing unit 104a may elect to first broadcast the bus read operation to all participants within its own coherency domain (e.g., processing node 102a), but not to participants in other coherency domains (e.g., processing node 102b). A broadcast operation transmitted to only those participants within the same coherency domain as the master of the operation is defined herein as a "local operation". If the local bus read operation can be serviced within the coherency domain of processing unit 104a, then no further broadcast of the bus read operation is performed. If, however, the partial responses and combined response to the local bus read operation indicate that the bus read operation cannot be serviced solely within the coherency domain of processing node 102a, the scope of the broadcast may then be extended to include, in addition to the local coherency domain, one or more additional coherency domains.

In a basic implementation, two broadcast scopes are employed: a "local" scope including only the local coherency domain and a "global" scope including all of the other coherency domains in the SMP data processing system. Thus, an operation that is transmitted to all coherency domains in an SMP data processing system is defined herein as a "global operation". Importantly, regardless of whether local operations or operations of more expansive scope (e.g., global operations) are employed to service operations, cache coherency is maintained across all coherency domains in the SMP data processing system.

In a preferred embodiment, the scope of an operation is indicated in a bus operation by a local/global indicator (signal), which in one embodiment may comprise a 1-bit flag. Forwarding logic 212 within processing units 104 preferably determines whether or not to forward an operation received via local interconnect 114 onto system interconnect 110 based upon the setting of the local/global indicator (signal) in the operation.

V. Domain Indicators

Figure 5:
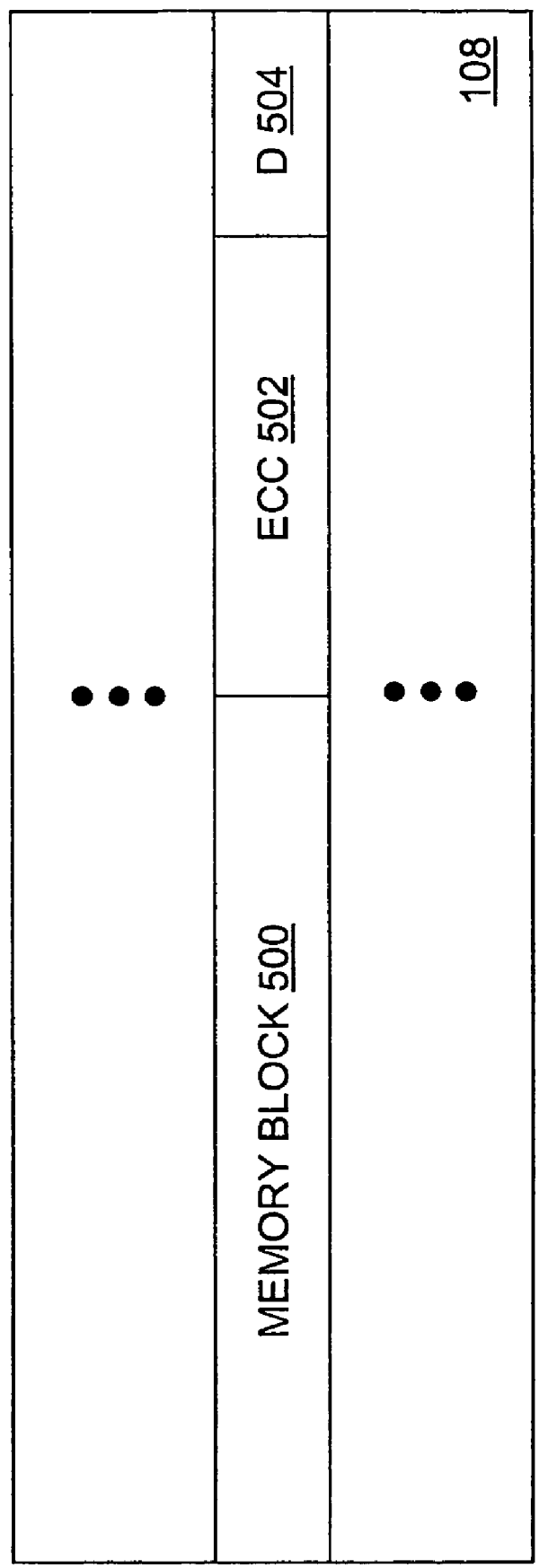
FIG. 5 illustrates a domain indicator in accordance with a preferred embodiment of the present invention.

In order to limit the issuance of unneeded local operations and thereby reduce operational latency and conserve additional bandwidth on local interconnects, the present invention preferably implements a domain indicator per memory block that indicates whether or not a copy of the associated memory block is cached outside of the local coherency domain. For example, FIG. 5 depicts a first exemplary implementation of a domain indicator in accordance with the present invention. As shown in FIG. 5, a system memory 108, which may be implemented in dynamic random access memory (DRAM), stores a plurality of memory blocks 500. System memory 108 stores in association with each memory block 500 an associated error correcting code (ECC) 502 utilized to correct errors, if any, in memory block 500 and a domain indicator 504. Although in some embodiments of the present invention, domain indicator 504 may identify a particular coherency domain (i.e., specify a coherency domain or node ID), it is hereafter assumed that domain indicator 504 is a 1-bit indicator that is set (e.g., to '1' to indicate "local") if the associated memory block 500 is cached, if at all, only within the same coherency domain as the memory controller 206 serving as the LPC for the memory block 500. Domain indicator 504 is reset (e.g., to '0' to indicate "global") otherwise. The setting of domain indicators 504 to indicate "local" may be implemented imprecisely in that a false setting of "global" will not induce any coherency errors, but may cause unneeded global broadcasts of operations.

Importantly, memory controllers 206 (and L2 caches 230) that source a memory block in response to an operation preferably transmit the associated domain indicator 504 in conjunction with the requested memory block.

VI. Exemplary Coherency Protocol

The present invention preferably implements a cache coherency protocol designed to leverage the implementation of data delivery and coherency domains as described above. In a preferred embodiment, the cache coherency states within the protocol, in addition to providing (1) an indication of whether a cache is the HPC for a memory block, also indicate (2) whether the cached copy is unique (i.e., is the only cached copy system-wide) among caches at that memory hierarchy level, (3) whether and when the cache can provide a copy of the memory block to a master of a request for the memory block, (4) whether the cached image of the memory block is consistent with the corresponding memory block at the LPC (system memory), and (5) whether another cache in a remote coherency domain (possibly) holds a cache entry having a matching address. These five attributes can be expressed, for example, in an exemplary variant of the well-known MESI (Modified, Exclusive, Shared, Invalid) protocol summarized below in Table II.

TABLE II

| Cache state | HPC? | Unique? | Data source? | Consistent with LPC? | Cached outside local domain? | Legal concurrent states |
| --- | --- | --- | --- | --- | --- | --- |
| M | yes | yes | yes, before CR | no | no | I, Ig, In (&LPC) |
| Me | yes | yes | yes, before CR | yes | no | I, Ig, In (&LPC) |
| T | yes | unknown | yes, after CR if none provided before CR | no | unknown | Sr, S, I, Ig, In (& LPC) |
| Tn | yes | unknown | yes, after CR if none provided before CR | no | no | Sr, S, I, Ig, In (& LPC) |
| Te | yes | unknown | yes, after CR if none provided before CR | yes | unknown | Sr, S, I, Ig, In (& LPC) |

TABLE II-continued

| Cache state | HPC? | Unique? | Data source? | Consistent with LPC? | Cached outside local domain? | Legal concurrent states |
|---|---|---|---|---|---|---|
| Ten | yes | unknown | yes, after CR if none provided before CR | yes | no | Sr, S, I, Ig, In (& LPC) |
| Sr | no | unknown | yes, before CR | unknown | unknown | T, Tn, Te, Ten, S, I, Ig, In (& LPC) |
| S | no | unknown | no | unknown | unknown | T, Tn, Te, Ten, Sr, S, I, Ig, In (& LPC) |
| I | no | n/a | no | n/a | unknown | M, Me, T, Tn, Te, Ten, Sr, S, I, Ig, In (&LPC) |
| Ig | no | n/a | no | n/a | Assumed so, in absence of other information | M, Me, T, Tn, Te, Ten, Sr, S, I, Ig, In (&LPC) |
| In | no | n/a | no | n/a | Assumed not, in absence of other information | M, Me, T, Tn, Te, Ten, Sr, S, I, Ig, In (&LPC) |

A. Ig State

In order to avoid having to access the LPC to determine whether or not the memory block is known to be cached, if at all, only locally, the Ig (Invalid global) coherency state is utilized to maintain a domain indication in cases in which no copy of a memory block remains cached in a coherency domain. The Ig state is defined herein as a cache coherency state indicating (1) the associated memory block in the cache array is invalid, (2) the address tag in the cache directory is valid, and (3) a copy of the memory block identified by the address tag may possibly be cached in another coherency domain. The Ig indication is preferably imprecise, meaning that it may be incorrect without a violation of coherency.

The Ig state is formed in a lower level cache in response to that cache providing a requested memory block to a requestor in another coherency domain in response to an exclusive access request (e.g., a bus RWITM operation). In some embodiments of the present invention, it may be preferable to form the Ig state only in the coherency domain containing the LPC for the memory block. In such embodiments, some mechanism (e.g., a partial response by the LPC and subsequent combined response) must be implemented to indicate to the cache sourcing the requested memory block that the LPC is within its local coherency domain. In other embodiments that do not support the communication of an indication that the LPC is local, an Ig state may be formed any time that a cache sources a memory block to a remote coherency domain in response to an exclusive access request.

Because cache directory entries including an Ig state carry potentially useful information, it is desirable in at least some implementations to preferentially retain entries in the Ig state over entries in the I state (e.g., by modifying the Least Recently Used (LRU) algorithm utilized to select a victim cache entry for replacement). As Ig directory entries are retained in cache, it is possible for some Ig entries to become "stale" over time in that a cache whose exclusive access request caused the formation of the Ig state may deallocate or writeback its copy of the memory block without notification to the cache holding the address tag of the memory block in the Ig state. In such cases, the "stale" Ig state, which incorrectly indicates that a global operation should be issued instead of a local operation, will not cause any coherency errors, but will merely cause some operations, which could otherwise be serviced utilizing a local operation, to be issued as global operations. Occurrences of such inefficiencies will be limited in duration by the eventual replacement of the "stale" Ig cache entries.

Several rules govern the selection and replacement of Ig cache entries. First, if a cache selects an Ig entry as the victim for replacement, a castout of the Ig entry is performed (unlike the case when an I entry is selected). Second, if a request that causes a memory block to be loaded into a cache hits on an Ig cache entry in that same cache, the cache treats the Ig hit as a cache miss and performs a castout operation with the an Ig entry as the selected victim. The cache thus avoids avoid placing two copies of the same address tag in the cache directory. Third, the castout of the Ig state is preferably performed as a local operation, or if performed as a global operation, ignored by the LPC of the castout address. If an Ig entry is permitted to form in a cache that is not within the same coherency domain as the LPC for the memory block, no update to the domain indicator in the LPC is required. Fourth, the castout of the Ig state is preferably performed as a dataless address-only operation in which the domain indicator is written back to the LPC (if local to the cache performing the castout).

Implementation of an Ig state in accordance with the present invention improves communication efficiency by maintaining a cached domain indicator for a memory block in a coherency domain even when no valid copy of the memory block remains cached in the coherency domain. As a consequence, an HPC for a memory block can service an exclusive access request (e.g., bus RWITM operation) from a remote coherency domain without retrying the request and performing a push of the requested memory block to the LPC.

B. In State

The In state is defined herein as a cache coherency state indicating (1) the associated memory block in the cache array is invalid, (2) the address tag in the cache directory is valid, and (3) a copy of the memory block identified by the address tag is likely cached, if at all, only by one or more other cache hierarchies within the local coherency domain. The In indication is preferably imprecise, meaning that it may be incorrect without a violation of coherency. The In state is formed in a lower level cache in response to that cache providing a requested memory block to a requestor in the same coherency domain in response to an exclusive access request (e.g., a bus RWITM operation).

Because cache directory entries including an In state carry potentially useful information, it is desirable in at least some implementations to preferentially retain entries in the In state over entries in the I state (e.g., by modifying the Least Recently Used (LRU) algorithm utilized to select a victim cache entry for replacement). As In directory entries are retained in cache, it is possible for some In entries to become "stale" over time in that a cache whose exclusive access request caused the formation of the In state may itself supply a shared copy of the memory block to a remote coherency domain without notification to the cache holding the address tag of the memory block in the In state. In such cases, the "stale" In state, which incorrectly indicates that a local operation should be issued instead of a global operation, will not cause any coherency errors, but will merely cause some operations to be erroneously first issued as local operations, rather than as global operations. Occurrences of such inefficiencies will be limited in duration by the eventual replacement of the "stale" In cache entries. In a preferred embodiment, cache entries in the In coherency state are not subject to castout, but are instead simply replaced. Thus, unlike Ig cache entries, In cache entries are not utilized to update domain indicators 504 in system memories 108.

Implementation of an In state in accordance with the present invention improves communication efficiency by maintaining a cached domain indicator for a memory block that may be consulted by a master in order to select a local scope for one of its operations. As a consequence, bandwidth on system interconnect 110 and local interconnects 114 in other coherency domains is conserved.

C. Sr State

In the operations described below, it is useful to be able to determine whether or not a lower level cache holding a shared requested memory block in the Sr coherency state is located within the same domain as the requesting master. In one embodiment, the presence of a "local" Sr snooper within the same domain as the requesting master can be indicated by the response behavior of a snooper at a lower level cache holding a requested memory block in the Sr coherency state. For example, assuming that each bus operation includes a scope indicator indicating whether the bus operation has crossed a domain boundary (e.g., an explicit domain identifier of the master or a single local/not local bit), a lower level cache holding a shared memory block in the Sr coherency state can provide a partial response affirming the request in the Sr state only for requests by masters within the same data sourcing domain and provide partial responses indicating the S state for all other requests. In such embodiments the response behavior can be summarized as shown in Table III, where prime (') notation is utilized to designate partial responses that may differ from the actual cache state of the memory block.

Assuming the response behavior set forth above in Table III, the average data latency for shared data can be significantly decreased by increasing the number of shared copies of memory blocks distributed within an SMP data processing system that may serve as data sources.

VII. Selective Consideration of Lower Level Cache State

Figure 6A:
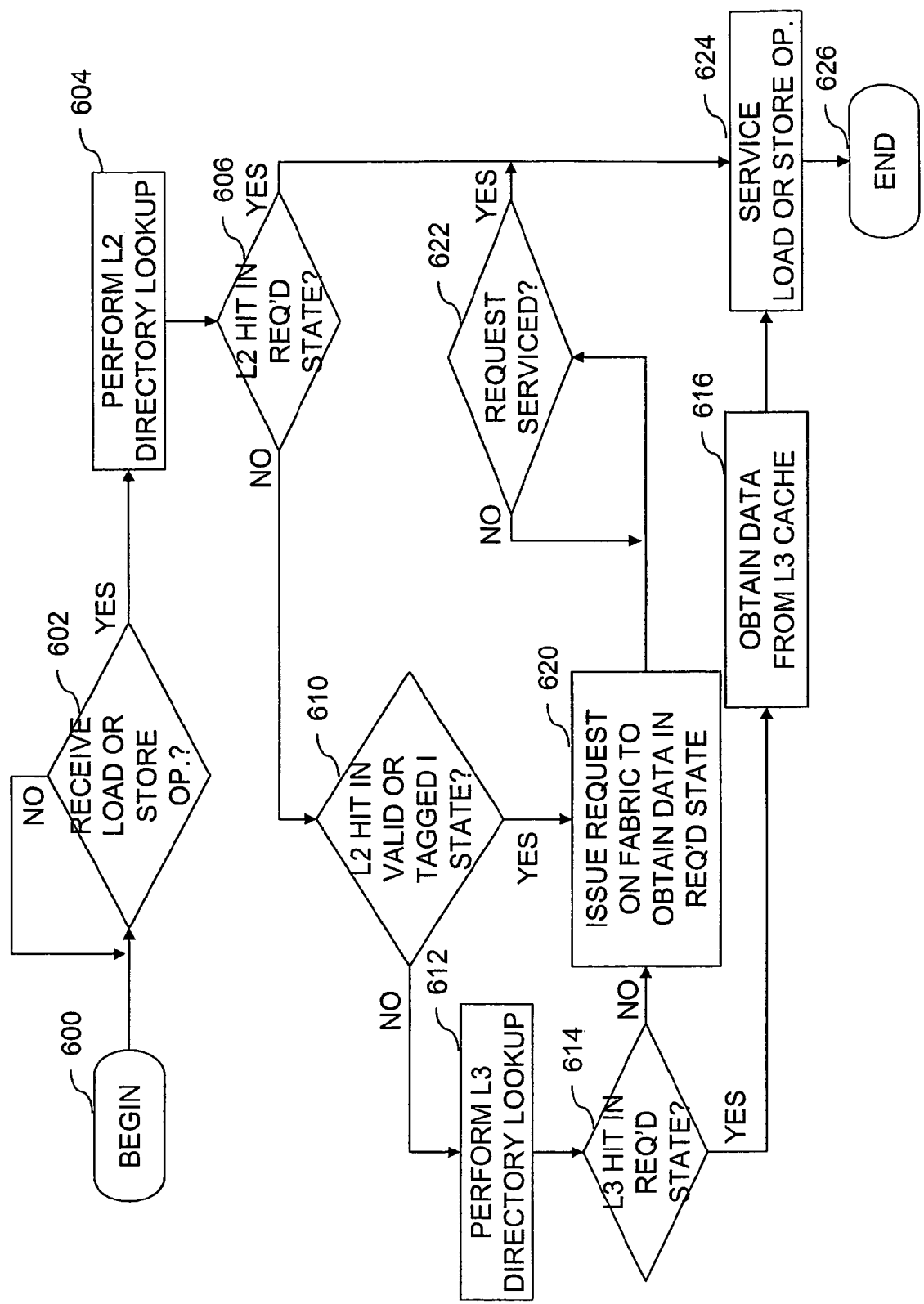
FIG. 6A is a high level logical flowchart of a first exemplary embodiment of a method of servicing a memory access request within a cache hierarchy in accordance with the present invention.

Referring now to FIG. 6A, there is depicted a high level logical flowchart of a first exemplary embodiment of a method of servicing a memory access request within a cache hierarchy in accordance with the present invention. The illustrated process begins at block 600 and then proceeds to block 602, which depicts master 232 of L2 cache 230 determining whether or not it has received a memory access (i.e., a load or store) operation from one or more of its associated processor cores 200. In general, the memory access operation includes an indication of a desired type of access (i.e., load or store) and a target real address. If a memory access operation has not been received, the process iterates at block 602 until a memory access operation is received. In response to receipt of a memory access operation, master 232 initiates a lookup of L2 cache directory 302 at block 604 to determine the coherency state, if any, recorded within L2 cache directory 302 for the target address specified by the memory access operation.

In response to receipt of the result of the lookup of L2 cache directory 302, master 232 determines whether or not the coherency state, if any, recorded within L2 cache directory 302 for the target address permits the memory access operation to be serviced without first accessing a lower level of the memory hierarchy (block 606). For example, if the memory access operation is a load operation and if L2 cache directory 302 indicates that the target address is associated with any valid coherency state (e.g., M, Me, T, Tn, Te, Ten, Sr, or S), then master 232 may service the memory access operation without first accessing a lower level of the memory hierarchy by simply supplying the memory block to the requesting processor core from L2 cache array 300. For a store operation, master 232 may service the operation by performing the indicated update to L2 cache array 300 without first accessing a lower level of the memory hierarchy to obtain the target memory block in the required coherency state only if L2 cache directory 302 indicates that the target address is associated with one of the M, Me, T, Tn, Te or Ten coherency states. Master 232 cannot service a load or store operation without first accessing a lower level of the memory hierarchy if the target address is associated with any of the I, Ig, or In coherency states or is simply absent (i.e., misses) L2 cache directory 302.

TABLE III

| Domain of master of read-type request | Cache state in directory | Partial response (adequate resources available) | Partial response (adequate resources unavailable) |
|---|---|---|---|
| "local" (i.e., within same domain) | Sr | Sr' affirm | Sr' possibly hidden |
| "remote" (i.e., not within same domain) | Sr | S' affirm | S' possibly hidden |
| "local" (i.e., within same domain) | S | S' affirm | S' possibly hidden |
| "remote" (i.e., not within same domain) | S | S' affirm | S' possibly hidden |

In response to master 232 determining at block 606 that the target address hit in L2 cache directory 302 in a coherency state that permits the memory access operation to be serviced without first accessing a lower level of the memory hierarchy, the process proceeds from block 606 to block 624, which illustrates master 232 servicing the load or store operation either by supplying the requested memory block to the requesting processor core 200 or by updating the target memory block in L2 cache array 300. The steps involved in servicing the memory access operation are explained in greater detail in the co-pending application incorporated by reference above. Following block 624, the process ends at block 626.

Returning to block 606, if master 232 determines that the target address did not hit in L2 cache directory 302 in a coherency state that permits the memory access operation to be serviced without first accessing a lower level of the memory hierarchy, the process proceeds from block 606 to block 610. Block 610 depicts master 232 determining whether or not the coherency state of the target address with reference to L2 cache directory 302 is such that lookup of L3 cache directory 254 should be performed prior to issuing a memory access request for the target address on the interconnect fabric comprising local and system interconnects 110, 114. For example, if the target address hit in L2 cache directory 302 in one of the "tagged" I states (e.g., In or Ig), master 232 preferably elects to issue a memory access request for the target address on the interconnect fabric without first accessing L3 directory 254 because, as noted above, these coherency states are established when a processing unit 200 associated with a different cache hierarchy successfully issues a memory access request (e.g., RWITM or DClaim) on the interconnect fabric to obtain exclusive access to the target memory block. Consequently, it is preferable to issue the memory access request on the interconnect fabric without first incurring the additional latency associated with a lookup of L3 directory 254 because it is unlikely that L3 directory 254 holds the target address in one of the coherency states required to service the load or store operation. Similarly, for a store operation, if the lookup of the target address in L2 cache directory 302 yields one of the In, Ig, S or Sr coherency states, it is preferable from a latency standpoint to issue the memory access request on the interconnect fabric without first incurring the additional latency associated with a lookup of L3 directory 254 because it is unlikely that L3 directory 254 holds the target address in one of the coherency states required to service the store operation.

In response to master 232 determining at block 610 that the coherency state of the target address with reference to L2 cache directory 302 indicates that lookup of L3 cache directory 254 should not be performed prior to issuing a memory access request for the target address on the interconnect fabric, master 232 issues a memory access request for the target address on the interconnect fabric, as shown at block 620. As indicated at block 622, master 232 thereafter waits until the memory access request issued on the interconnect fabric is serviced, for example, through provision of the target memory block or a coherency message indicating that master 232 may update the coherency state for the target address within L2 cache directory 302 to a state required to perform the memory access operation. Thereafter, the process proceeds to block 624 and 626, which have been described.

It will be appreciated that in a small percentage of cases, the speculative bypass of L3 cache 250 will prove to be incorrect in that the L3 cache 250 of the requesting processing unit 104 holds the required memory block in a coherency state that permits the memory access operation to be serviced. To avoid errors, L3 cache controller 252 therefore snoops memory access requests on the interconnect fabric (including those requests issued by its processing unit 104) and responds to those memory access requests via the interconnect fabric like any other snooper. In this manner, if the speculative bypass of L3 cache 250 proves to be incorrect, the memory access operation can still be serviced, albeit at a longer latency than would have been incurred if the L3 cache 250 had been accessed directly by L2 cache 230 prior to issuing the memory access request on the interconnect fabric.

Returning to block 610, in response to master 232 determining that the coherency state of the target address with reference to L2 cache directory 302 indicates that lookup of L3 cache directory 254 should be performed prior to issuing a memory access request for the target address on the interconnect fabric, master 232 initiates a lookup of L3 directory 254, as illustrated at block 612. Master 232 then determines at block 614 whether or not the target address hit in L3 directory 254 in a coherency state that permits the memory access operation to be serviced without issuing a request on the interconnect fabric. If not, the process passes to block 620, which has been described. If, however, master 232 determines the target address hits in L3 directory 254 in a coherency state that permits the memory access operation to be serviced without issuing a request on the interconnect fabric, the process passes to block 616, which illustrates L2 cache 230 receiving the target cache block from L3 cache 250. Thereafter, master 232 services the memory access operation, as shown at block 624, and the process ends at block 626.

FIG. 6A thus illustrates an embodiment in which access to L3 cache 250 is sequential with and contingent upon the coherency state of the target address within L2 cache 230. As will be appreciated, this embodiment prevents unnecessary utilization of L3 cache directory 254 in cases in which L2 cache 230 can service the memory access operation without accessing lower level memory or in which a request must be issued on the interconnect fabric. However, in other embodiments of the present invention, such as that described below with reference to FIG. 6B, access to L3 cache 250 may be made concurrently with the lookup of L2 cache directory 302.

Figure 6B:
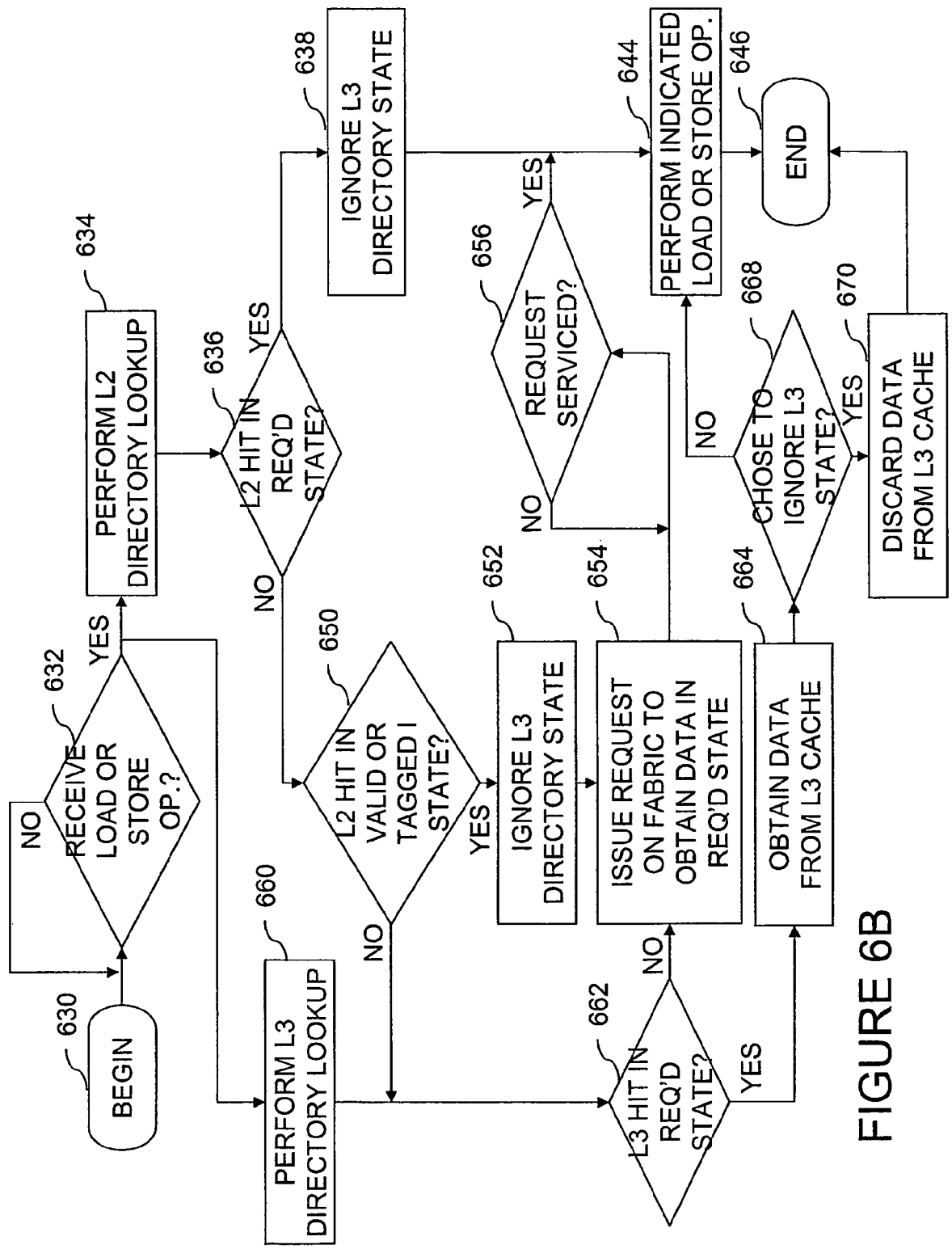
FIG. 6B is a high level logical flowchart of a second exemplary embodiment of a method of servicing a memory access request within a cache hierarchy in accordance with the present invention.

With reference now to FIG. 6B, there is illustrated a high level logical flowchart of a second exemplary embodiment of a method of servicing a memory access request within a cache hierarchy in accordance with the present invention. The illustrated process begins at block 630 and then proceeds to block 632, which depicts master 232 of L2 cache 230 determining whether or not it has received a memory access (i.e., a load or store) operation from one or more of its associated processor cores 200. As noted above, the memory access operation includes an indication of a desired type of access (i.e., load or store) and a target real address identifying a target memory block. If a memory access operation has not been received, the process iterates at block 632 until a memory access operation is received. In response to receipt of a memory access operation, master 232 initiates a lookup of L2 cache directory 302 at block 634 to determine the coherency state, if any, recorded within L2 cache directory 302 for the target address specified by the memory access operation. Concurrently, master 232 also initiates a look of L3 directory 254 to determine the coherency state, if any, recorded within L3 directory 254 for the target address specified by the memory access operation. In general, master 232 will receive the results of the L2 directory lookup in advance of receipt of the results of the L3 directory lookup.

In response to receipt of the result of the lookup of L2 cache directory 302, master 232 determines at block 636 whether or not the coherency state, if any, recorded within L2 cache directory 302 for the target address permits the memory access operation to be serviced without first accessing a lower level of the memory hierarchy. In response to master 232 determining at block 636 that the target address hit in L2 cache directory 302 in a coherency state that permits the memory access operation to be serviced without first accessing a lower level of the memory hierarchy, the process proceeds from block 636 to block 638, which illustrates master 232 ignoring the results of the lookup of L3 directory 254. Master 232 then services the load or store operation either by supplying the requested memory block to the requesting processor core 200 or by updating the target memory block in L2 cache array 300, as illustrated at block 644. As noted above, the steps involved in servicing the memory access operation are explained in greater detail in the co-pending application incorporated by reference above. Following block 644, the process ends at block 646.

Returning to block 636, if master 232 determines that the target address did not hit in L2 cache directory 302 in a coherency state that permits the memory access operation to be serviced without first accessing a lower level of the memory hierarchy, the process proceeds from block 636 to block 650. Block 650 depicts master 232 determining whether or not the coherency state of the target address is valid or in one of the "tagged" I states (e.g., In or Ig) in L2 cache directory 302. If the target address hit in L2 cache directory 302 in one of the "tagged" I states (e.g., In or Ig) or in a valid state that does not permit the memory access operation to be serviced without first accessing a lower level of the memory hierarchy, master 232 ignores the results of the L3 directory lookup when received (block 652) and issues a memory access request for the target address on the interconnect fabric without waiting for the results of the L3 directory lookup (block 654) because, as noted above, these coherency states are established when a processing unit 200 associated with a different cache hierarchy successfully issues a memory access request (e.g., RWITM or DClaim) on the interconnect fabric to obtain exclusive access to the target memory block. Consequently, it is preferable to issue the memory access request on the interconnect fabric without incurring the additional latency associated with waiting for the results of the lookup of L3 directory 254 because it is unlikely that L3 directory 254 holds the target address in one of the coherency states required to service the load or store operation. As indicated at block 656, master 232 thereafter waits until the memory access request issued on the interconnect fabric is serviced, for example, through provision of the target memory block or a coherency message indicating that master 232 may update the coherency state for the target address within L2 cache directory 302 to a state required to perform the memory access operation. Thereafter, the process proceeds to block 644 and 646, which have been described.

Returning to block 650, in response to master 232 determining that the target address did not hit in L2 cache directory 302 in one of the "tagged" I states (e.g., In or Ig) or in a valid state that does not permit the memory access operation to be serviced without first accessing a lower level of the memory hierarchy, master 232 awaits the results of the lookup of L3 directory 254. In response to receipt of the results of the L3 directory lookup, master 232 determines at block 662 if the target address hit in L3 directory 254 in a coherency state that permits master 232 to service the memory access operation without issuing a request on the interconnect fabric. If not, the process passes to block 654, which has been described. If, however, master 232 determines at block 662 that the target address hit in L3 directory 254 in a coherency state that permits the memory access operation to be serviced without issuing a request on the interconnect fabric, the process passes to block 664, which illustrates L2 cache 230 receiving the target cache block from L3 cache 250. Master 232 then determines at block 668 whether or not it chose to ignore the L3 directory state. If so, master 232 discards the memory block received directly from L3 cache 250, as shown at block 670, and instead waits to receive the target memory block from L3 cache 250 via the interconnect fabric. Following block 670, this branch of the illustrated process ends at block 646. If, on the other hand, master 232 determines that it did not choose to ignore the L3 directory state of the target memory block, master 232 services the memory access operation utilizing the data provided by L3 cache 250, as shown at block 644. The process thereafter ends at block 646.

It should again be noted that in a small percentage of cases, the speculative bypass of L3 cache 250 will prove to be incorrect in that the L3 cache 250 of the requesting processing unit 104 holds the required memory block in a coherency state that permits the memory access operation to be serviced. To avoid errors, L3 cache controller 252 snoops memory access requests on the interconnect fabric (including those requests issued by its processing unit 104) and responds to those memory access requests via the interconnect fabric like any other snooper. In this manner, if the speculative bypass of L3 cache 250 proves to be incorrect, the memory access operation can still be serviced, albeit at a longer latency than would have been incurred if L2 cache 230 had directly accessed the L3 cache 250.

As has been described, the present invention provides an improved data processing system, processing unit, cache hierarchy and method of data processing that reduce memory access latency by selectively issuing memory access requests on an interconnect fabric coupling cache hierarchies without waiting on the results of a lookup of at least one lower level cache directory. The decision to issue the memory access request on the interconnect fabric without waiting on the results of lookup of a lower level cache directory is made based at least in part on a coherency state associated with the target address in a cache directory.

While the invention has been particularly shown as described with reference to a preferred embodiment, it will be understood by those skilled in the art that various changes in form and detail may be made therein without departing from the spirit and scope of the invention.

What is claimed is:

1. A method of data processing in a data processing system including a first processor core supported by a first cache hierarchy, a second processor core supported by a second cache hierarchy and an interconnect fabric, said method comprising:

in response to a master in the first cache hierarchy receiving a memory access request indicating a target address, the master accessing a first cache directory of an upper level cache of the first cache hierarchy;

in response to said target address being associated in said first cache directory with an entry having a valid address tag and a first invalid coherency state, said master issuing a request specifying said target address to the second cache hierarchy on the interconnect fabric without regard to a coherency state associated with said target address in a second cache directory of a lower level cache of said first cache hierarchy; and in response to said target address having a second invalid coherency state with respect to said first cache directory, said master issuing a request specifying said target address to the second cache hierarchy on said interconnect fabric after determining a coherency state associated with said target address in said second cache directory of said lower level cache of said first cache hierarchy.

2. The method of claim 1, and further comprising:
performing a lookup of said second cache directory concurrently with accessing said first cache directory.

3. The method of claim 2, and further comprising ignoring results of the lookup of said second cache directory if said target address is associated in said first cache directory with an entry having a valid address tag and a first invalid coherency state.

4. The method of claim 1, and further comprising:
performing a lookup of said second cache directory in response to determining said target address is not associated in said first cache directory with an entry having said first invalid coherency state.

5. The method of claim 1, wherein:
said master is a first master; and
said first invalid coherency state indicates that a second master of the second cache hierarchy has obtained exclusive access to a target memory block associated with said target address.

6. The method of claim 1, wherein said step of:
in response to said target address having a second invalid coherency state with respect to said first cache directory, said master issuing a request specifying said target address on an interconnect fabric after determining a coherency state associated with said target address in said second cache directory of said lower level cache of said first cache hierarchy comprises:
said master issuing a request specifying said target address on said interconnect fabric after determining that said coherency state associated with said target address in said second cache directory of said lower level cache does not permit said memory access request to be serviced without issuing said request on said interconnect fabric.

7. A processing unit, comprising:
interconnect logic that interfaces the processing unit to an interconnect fabric;
a processor core;
a first cache hierarchy including at least an upper level cache and a lower level cache, wherein said upper level cache includes a first cache directory and said lower level cache includes a second cache directory;
wherein said upper level cache further includes a master that, responsive to receiving a memory access request from the processor core indicating a target address, accesses said first cache directory, and responsive to said target address being associated in said first cache directory with an entry having a valid address tag and a first invalid coherency state, issues a first request specifying said target address to a second cache hierarchy on the interconnect fabric without regard to a coherency state associated with said target address in said second cache directory; and
wherein said master, responsive to said target address having a second invalid coherency state with respect to said first cache directory, issues a second request specifying said target address to the second cache hierarchy on said interconnect fabric after determining a coherency state associated with said target address in said second cache directory of said lower level cache of said first cache hierarchy.

8. The processing unit of claim 7, wherein said master performs a lookup of said second cache directory concurrently with accessing said first cache directory.

9. The processing unit of claim 8, wherein said master ignores results of the lookup of said second cache directory if said target address is associated in first cache directory with an entry having a valid address tag and a first invalid coherency state.

10. The processing unit of claim 7, wherein said master performs a lookup of said second cache directory in response to determining said target address is not associated in first cache directory with an entry having said first invalid coherency state.

11. The processing unit of claim 7, wherein:
said master is a first master; and
said first invalid coherency state indicates that a second master of the second cache hierarchy has obtained exclusive access to a target memory block associated with said target address.

12. The processing unit of claim 7, wherein said master issues said second request on said interconnect fabric after determining that said coherency state associated with said target address in said second cache directory of said lower level cache does not permit said memory access request to be serviced without issuing said request on said interconnect fabric.

13. A data processing system, comprising:
an interconnect fabric;
a system memory coupled to the interconnect fabric;
a plurality of processing units coupled to the interconnect fabric, wherein a first processing unit among said plurality of processing units includes:
interconnect logic that interfaces the processing unit to an interconnect fabric;
a processor core;
a first cache hierarchy including at least an upper level cache and a lower level cache,
wherein said upper level cache includes a first cache directory and said lower level cache includes a second cache directory;
wherein said upper level cache further includes a master that, responsive to receiving a memory access request from the processor core indicating a target address, accesses said first cache directory, and responsive to said target address being associated in said first cache directory with an entry having a valid address tag and a first invalid coherency state, issues a first request specifying said target address to a second processing unit among said plurality of processing units on said interconnect fabric without regard to a coherency state associated with said target address in said second cache directory; and
wherein said master, responsive to said target address having a second invalid coherency state with respect to said first cache directory, issues a second request specifying said target address to the second processing unit on said interconnect fabric after determining a coherency state associated with said target address in said second cache directory of said lower level cache of said first cache hierarchy.

14. The data processing system of claim 13, wherein said master performs a lookup of said second cache directory concurrently with accessing said first cache directory.

15. The data processing system of claim 14, wherein said master ignores results of the lookup of said second cache directory if said target address is associated in said first cache directory with an entry having a valid address tag and a first invalid coherency state.

16. The data processing system of claim 13, wherein said master performs a lookup of said second cache directory in response to determining said target address is not associated in said first cache directory with an entry having said first invalid coherency state.

17. The data processing system of claim 13, wherein:
said master is a first master; and
said first invalid coherency state indicates that a second master in said second processing unit has obtained exclusive access to a target memory block associated with said target address.

18. The data processing system of claim 13, wherein said master issues said second request on said interconnect fabric after determining that said coherency state associated with said target address in said second cache directory of said lower level cache does not permit said memory access request to be serviced without issuing said request on said interconnect fabric.

* * * * *